United States Patent
Reddy et al.

(12)

(10) Patent No.: US 6,322,842 B1
(45) Date of Patent: Nov. 27, 2001

(54) WATER IN OIL STICK PRODUCT

(75) Inventors: Podutoori Ravinder Reddy, Columbia; Robert Andrew Madsen; Johannes Henricus Schuurman, both of Laurel, all of MD (US)

(73) Assignee: Van den Bergh Foods Company, division of Conopco, Inc., Lisle, IL (US)

( * ) Notice: Subject to any disclaimer, the term of this patent is extended or adjusted under 35 U.S.C. 154(b) by 1078 days.

(21) Appl. No.: 08/491,663

(22) Filed: Jun. 19, 1995

(51) Int. Cl.$^7$ ........................................ A23D 7/02
(52) U.S. Cl. ............................. 426/603; 426/602
(58) Field of Search ...................... 426/603, 602

(56) References Cited

U.S. PATENT DOCUMENTS

| | | | |
|---|---|---|---|
| 3,597,229 | * 8/1971 | Mynders | 426/603 |
| 4,388,339 | * 6/1983 | Lomneth | 426/603 |
| 4,425,371 | * 1/1984 | Stratmann | 426/603 |
| 5,169,668 | * 12/1992 | Milo | 426/603 |
| 5,302,408 | 4/1994 | Cain et al. | |
| 5,407,695 | * 4/1995 | Wheeler | 426/603 |
| 5,858,441 | * 1/1999 | Reddy | 426/603 |
| 5,858,445 | * 1/1999 | Huegunga | 426/603 |
| 5,904,949 | * 5/1999 | Reddy | 426/603 |
| 5,989,618 | * 11/1999 | Thurman | 426/603 |
| 6,025,010 | * 2/2000 | Reddy | 426/603 |
| 6,045,853 | * 4/2000 | Reddy | 426/603 |
| 6,171,637 | * 1/2001 | Reddy | 426/603 |
| 6,203,842 | * 3/2001 | Reddy | 426/603 |

FOREIGN PATENT DOCUMENTS

| | | | |
|---|---|---|---|
| 643763 | * 10/1991 | (AU) | 426/603 |
| 9108677 | * 6/1991 | (US) | 426/603 |

OTHER PUBLICATIONS

List 1995 Preparation & Properties of Zero Trans Soybean Oil Margarines IAOCS vol. 72 (3) 383.*
Gunstone 1983 Lipids in Foods Chemistry, Biochemistry and Technology Pergamon Press New York p. 147–155.*

* cited by examiner

*Primary Examiner*—Carolyn Paden
(74) *Attorney, Agent, or Firm*—Edward A. Sequillante, Jr.; Matthew Boxer

(57) ABSTRACT

A fat continuous stick having up to 80% of a fat containing less than 10% trans fatty acids prepared by a process comprising the steps of selecting a structuring amount of an interesterfied hardstock fat to make a stick product, combining the hardstock to form a fat phase, introducing an aqueous phase and the fat phase into a scrapped surface heat exchanger to form a cooled emulsion having an exit temperature of less than 20° C., then passing the cooled emulsion into a crystallizing unit (C-unit) having an exit temperature of C-unit greater than the exit temperature of the emulsion and having a shear rate of less than 1800 rpm to aid in forming a finer dispersion and to initiate crystallization in the cooled emulsion. The emulsion with the fat crystals is then introduced into a second heat exchanger unit having a temperature range of at least 2–8° C. below the exit temperature of the emulsion from the first exchanger unit wherein the residence time of the process is less than ten minutes. The hardstock fat is interesterfied as described herein.

12 Claims, No Drawings

WATER IN OIL STICK PRODUCT

FIELD OF THE INVENTION

The invention relates to a fat continuous stick product having up to 80% of a fat phase and having a trans fatty acid level of less than 10%. The wrapper product is prepared by a novel process of passing the fat and aqueous phases into a crystallizing unit between two scrapped surface heat exchangers, such that the crystallizer provides shear and does not contribute significantly to the residence time.

BACKGROUND OF THE INVENTION

Margarine and spreads in the form of stick products are popular with many consumers who enjoy the serving size and shape of such products. To form a stick product, the plastic dispersion must contain from about 30 to 80% fat, stand up under its own weight at room temperature and be processible to be packed in a wrapper package. Additionally, consumer trends have been toward such stick products based on vegetable fats which spread easily, have a good melting behavior in both the mouth and on heated food items, contain a relatively high proportion of unsaturated fatty acids and also have a relatively low trans fatty acid level, preferably a level lower than 10%.

Conventional stick products containing much higher levels of trans fatty acids (i.e. greater than 10%) are cooled in scrapped surface heat exchanger units (A-units) before passing into a resting tube (B-unit). The conventional process thus provides a residence time in the resting tube so that the cooled oil or fat phase is substantially crystallized during the process rather than during storage.

With emulsions prepared from oil phases containing low levels of trans fatty acids, it was observed that conventional processing produced post-crystallization during storage and the packed product was brittle. Additional residence time is provided by the crystallizing units (C-unit) and the resting tube (B-unit). Therefore, the rotors within the crystallizing units (C-units) are conventionally run at relatively low shear speeds (e.g. less than 250 rpm) to add additional residence time to the processing of the stick products and avoid post-crystallization during storage. Even after providing the additional residence time it is difficult to obtain a uniformly crystallized stick product which has ideal packing hardness and is not brittle.

Traditionally, the residence time provided by passing through the C-units is only done after cooling the emulsion to a temperature where some crystals are formed and is not subjected to high shear. There therefore exists a need for a process to prepare a plastic dispersion having less than 10% trans fatty acid levels in the form of a stick which has a desirable hardness without brittleness and which exhibits good organoleptic properties.

Another object of the invention is to provide a commercially economical process which provides faster product packing and yet is flexible enough to be modified as required.

SUMMARY OF THE INVENTION

This invention provides a novel process for producing a fat continuous plastic dispersion in the form of a stick which has up to 80% fat, less than 10% trans fatty acid content and has a mean aqueous phase droplet size distribution (d3.3) of less than 10 microns. The process comprises mixing a water phase and an oil phase containing an interesterfied hardstock in a scrapped surface heat exchanger so that the cooled emulsion has an exit temperature of less than about 20° C., (b) shearing the cooled emulsion in a crystallizing unit at a temperature greater than the exit temperature sufficient to form minimum alpha crystals (greater than 2%) of the cooled emulsion to provide shear to the cooled emulsion, (c) then cooling the emulsion containing the crystals in a second scrapped surface heat exchanger at a temperature of 2 to 8° C. below the exit temperature of the cooled emulsion from the first heat exchanger to form a plastic dispersion in a stick form with a mean water droplet size of less than 10 microns through the process providing longer residence time with either a C-unit or a B-unit alone or in combination, depending on the trans fatty acid levels. A stick product as described above prepared by the novel process is also presented.

DETAILED DESCRIPTION OF THE PREFERRED EMBODIMENTS

The process in the present invention provides a means of preparing a low trans fatty acid containing stick product in a residence time shorter than the times of conventional processes and yet by a process which avoids the common place problem of post-storage crystallization in such products. Contrary to conventional wisdom, it was discovered that a slow crystallizing fat blend having less than 10% trans fatty acids could be processed to form a stick product at shorter residence times than expected and yet without producing brittleness in the products.

A stick margarine or spread is prepared by combining an oil or fat phase and an aqueous phase. Depending on the desirable level of fat in the final product, the fat phase must contain 20 to 40% of a hardstock which has been interesterfied and 60 to 80% of a liquid vegetable oil to form a product having a trans fatty acid level is not more than 10% of the total composition. A partially or fully hardened vegetable oil may optionally be added to the fat phase.

Throughout the application, the terms "fat" and may be interchanged and refer to a variety of edible fatty triglycerides, such as soybean oil, cottonseed oil, peanut oil, olive oil, palm oil, corn oil, rapeseed oil, sunflower seed oil, sesame oil, safflower oil and mixtures thereof. If animal oils are desirable, sardine oil, lard and tallow may be used. Preferred vegetable oils include soybean oil, rapeseed oil, particularly low erucic acid, and mixtures thereof. To increase the levels of trans fatty acids in triglycerides, the vegetable oil may be partially or fully hardened.

Edible substances that are physically similar to triglyceride such as waxes, (e.g. jojoba oil) and poly fatty acid esters of mono- or disaccharides can be used as replacement or in a mixture with triglycerides may also be used.

The fat blend or hardstock useful in the invention should contain less than 10% trans fatty acids, preferably 0.1 to 8%, most preferably 0.1 to 5%. The hardstock is preferably prepared by randomly interesterfying a mixture containing 30 to 75 wt. % of an oil (i) in which at least 20% of the fatty acid residues consist of linoleic acid and 25 to 70 wt. % of a fat (ii) in which at least 80% of the fatty acid residues is saturated and have a chain link of at least 16 carbon atoms. The interesterfied mixture is then fractionated to contain an olein having the following solid fat content:

$N_{10}$=22 to 80

$N_{20}$=8 to 60

$N_{30}$=1 to 25

$N_{35}$=0 to 15

The higher melting stearin has been separated and 50 to 90% of the olein is mixed with 10 to 50 wt. % of an oil (iii) in which at least 40% of the fatty acid residues consist of linoleic acid.

The solid fat contents are expressed in N-values, essentially as described in Fette, Sefein, Anstrichmittel Vol. 80, pp. 180–186 (1978). Although the method was modified during the stabilization of the material before measurement, in all cases the fat was stabilized for 16 hours at 0° C. and one hour at the measuring temperature.

Oil (i) preferably is a vegetable oil, such as soybean oil, sunflower oil, safflower oil, rapeseed oil, particularly low erucic acid, cottonseed oil, maze oil, olive oil and mixtures thereof.

The oil or fat (ii) preferably is any of the oils (i) or a mixture thereof, which has been hydrogenated to obtain a fat in which at least 80% of the fatty acid residues is saturated using, for example, a freshly precipitated nickel catalyst under conditions avoiding trans fatty acids formation to a level of less than 10%. Oil or fat (ii) preferably has a melting point range of 50 to 70° C. and an iodine value of less than 10, preferably less than 5, most preferably about 1.

The oil (iii) preferably is a safflower oil, a sunflower oil, a maze oil, a grapeseed oil, a soybean oil, rapeseed oil, cottonseed oil or mixtures thereof.

Most preferably (i), (ii) and (iii) are from the same source for convenience and for availability for a reasonable price.

Random interesterfication can be carried out in any means known in the art such as described in U.S. Pat. No. 4,425, 371 issued to Stratman et al. on Jan. 10, 1984, herein incorporated by reference.

Fractionation can be carried out either in the presence or absence in a solvent, preferably using dry fractionation. An olein fraction obtained from the fractionation process is defined above a stearin obtained has the following characteristics:

$N_{10}$=45–70

$N_{15}$=44–65

$N_{20}$=42–52

$N_{25}$=30–40

$N_{30}$=27–37

$N_{35}$=20–30

The aqueous phase comprises from about 20 to about 70% water, preferably 20 to 60%. The mean aqueous phase droplet size distribution (d3.3) of the dispersed aqueous phase in the final product is less than 10 microns, preferably less than about 5 microns. The unit d3.3 is defined as the volume weighted mean of the droplet size distribution and can be determined with NMR as described J. C. van den Enden et. al., J. Colloid and Interface Science 140 (1990), pp. 105–113 and also described in U.S. Pat. No. 5,302,408, herein incorporated by reference. Such a droplet size is desirable to provide a microbiological stable product and yet to provide a flavor release in the mouth when the product is eaten.

The crystallization process of fat involves a cooling step in which the liquid oil becomes supersaturated with respect to certain acylglycerol components, followed by solidification. During crystallization, suitable fats can exist in more than one crystalline modification or exhibit polymorphism. The three phases observed for triglycerides are basically alpha, beta prime and beta. In the inventive process, the temperature of cooling in the initial scrapped surface heat exchanger unit (A-unit) must be below the temperature required to form a substantial amount of the triacyl glycerols in alpha phase, i.e. greater than 50% in alpha phase, preferably greater than 60%. In the alpha phase, the chains are oriented perpendicular to the end group plane. The phases of the crystallized fat may be determined by x-ray powder defraction which determines the orientation of the fat chains by any conventional method known in the art.

The compositions may also comprise dairy and non-dairy ingredients of the source of fat, flavoring and protein. The amount of the ingredient present in the compositions is selected depending on the effect of the protein ingredient on mouth feel and sourness. The dairy fat can be derived from any dairy source such as whole milk, semi-skimmed milk, skimmed milk, cultured buttermilk, buttermilk powder, skimmed milk powder, yogurt, quark, fromage frais, cottage cheese, whey powder, butter, etc.

To affect the flavor of the sticks of the invention dairy fat may optionally be incorporated in the product by using at least 3% of a dairy ingredient in the spread. The optimum level of dairy ingredients will be dependent on the type and fat level of the spread. Emulsifiers may also be included in the aqueous or fat phase. The amount and kind of emulsifier are not critical. It is preferred to incorporate emulsifiers of the type and quantity as are commonly used in spread and margarine products. For example, mixtures of mono- and diglycerides derived from natural, partially hydrogenated or fully hardened sunflower oil considerably be used, in an amount of 0.1 to about 0.5 wt. %, about 0.5 wt. %, calculated on the total weight of the product. Additionally, fat soluble flavors may be added. These flavors may be natural origin or artificially synthesized.

Minor amounts of optional ingredients can be included in the water phase of the formulation to achieve a desirable flavor and to retard microbiological deterioration of the product or in storage. Typical optional ingredient which are incorporated in the water phase are:

| | |
|---|---|
| salt, NaCl | 0.5 to 3.0 wt. % |
| potassium sorbate | 0.02 to 0.2 wt. % |
| EDTA | 50 to 100 ppm |

Acidifiers may be incorporated to bring the pH of the product to the desired level, preferably the pH is from 3 to 7, more preferred 3.5 to 5.5. Suitable acidifiers are lactic acid and citric acid.

For the process according to the invention, it is essential that the first three units in the production line of the stick product be a crystallizing unit (i.e. C-unit) positioned between two scrapped surface heat exchanger units (A-units) having particular temperature ranges relative to the C-unit. The C-unit must have a relatively high shear or shaft rotation.

The aqueous and fat phases may be pumped into the first heat exchanger unit (A-unit) in a batch wise manner or in a continuous process by separately metering each component into the A-unit. The A-unit not only mixes the fat and aqueous phases together, but also cools the emulsion and starts the crystallization process by removing the heat of crystallization. The temperature range in the A-unit must be relatively low in the range of less than 20° C., preferably 5 to 20° C., most preferably 7 to 15° C. The temperature of the emulsion in the A-unit is measured as it exits the unit and passes into the crystallization unit (C-unit) and is defined as the exit temperature of the cooled emulsion.

The cooled emulsion passes from the second A-unit into the C-unit which is a large tube with pins mounted on the wall and on a center rotor. The rotor is preferably a hollow, shaft upon which scrapper blades are mounted. In the C-unit crystallization continues so that the speed of the rotor should not be too high to break apart the crystals formed in the fat. The preferred rotor speed or shear rate is 250 to 1800 rpm, preferably 250 to 1000 rpm.

The length over the diameter of the C-unit is termed the L/D and should be 1 to 4 for the C-unit.

The temperature of the cooled emulsion exiting out of the C-unit must be greater than the exit temperature of the emulsion from the first A-unit, preferably 0.5 to 8° C. greater, most preferably 0.5 to 5° C. greater.

The crystal containing emulsion then passes from the crystallizing unit (C-unit) into a second heat exchanger unit (A-unit) to be cooled again to a temperature which must be at least 2 to 8° C., preferably 2 to 4° C. below the exit temperature of the cooled emulsion from the first A-unit.

The cooled emulsion may pass from the second heat exchanger into one or more crystallizing units for crystallizing inline to control the hardness of the product and then into another heat exchanger unit if additional cooling is desirable. A resting tube (B-unit) may also optionally be added to the end of the production line if additional residence time is desirable.

The residence time of the emulsion in the production process line (C-units and B-unit) should be about 2 minutes to about 10 minutes, preferably about 4 minutes to about 8 minutes. The desirable residence time depends on the amount of trans fatty acid in the product so that the greater the amount of trans fatty acids, the lower the residence time. For example, emulsions containing greater than about 4% trans fatty acids may require a residence time of less than 7 minutes so that only one crystallizer unit (C-unit) may be needed in the production line.

The fat phase in the third A-unit is cooled to a temperature sufficient to compensate for the heat generated in the crystallizing unit due to heat of crystallization and the fat phase is partially crystallized fat phase. By partially crystallized fat phase it is meant that more than about 60% by weight, and preferably about more than about 80% by weight of the hard fat in this phase is solidified or crystallized.

The final product may be packed in a stick form having a solids fat content of:

$N_{10}$=16–45

$N_{20}$=4–30

$N_{30}$=1–15

$N_{35}$=0–5

The following examples illustrate without limitation the subject invention.

EXAMPLE 1

Four stick samples were prepared according to the inventive process having the following formula of 68% fat:

|  | Weight % |
|---|---|
| Oil Phase | |
| Soybean oil | 39 |
| Partially hydrogenated soybean oil | 5.4 |
| Interesterfied hardstock -dry fractionated interesterfied mixture of fully hardened soybean oil and liquid oil | 23 |
| Saturated distilled monoglyceride (emulsifier) | 0.1 |
| Lecithin | 0.22 |
| Aqueous Phase | |
| Water | 28.7 |
| Salt | 1.6 |
| Whey Powder | 1.7 |
| Preservative | 0.1 |
| Acidifier | 0.05 |

The trans fatty acid percentage of the formed product was 3.2%.

The stick products were formed by processing through a production line having a sequence of:

A1-unit, C1-unit, A2-unit, C2-unit, C3-unit, A3-unit, B1-unit

The processing conditions were as follows:

| | |
|---|---|
| A1 temperature | 12° C. |
| A1 rpm | 500 |
| C1 volume | 0.5 liters |
| C1 rpm | 1000 |
| A2 temperature | 10° C. |
| A2 rpm | 500 |
| C2, C3 rpm | 150 |
| A3 temperature | 8° C. |
| A3 rpm | 500 |

The hardness values or C-values were measured by cone penetrometer as known in the art and averaged between 800 and 1,000. The products were observed to be smooth spreading, have good salt release in the mouth and packed well. None of the products were observed to be either too brittle or too soft.

EXAMPLE 2

68% stick products containing 4.5% trans fatty acids in the products were prepared both according to the process of the invention and in a prior art production line having only exchanger units (A-units). The sticks had the formulation described in Example 1 above with high levels of trans fatty acid and were processed as follows:

Sample 1 was processed according to the invention with a line arrangement of A1-unit-C1-Unit-A2-unit-A3-unit-B-unit.

Sample 2 was processed according to a line arrangement of A1-unit-A2-unit-A3-unit-B-unit.

The conditions for the processing were as follows:

|  | Sample 1 | Sample 2 |
| --- | --- | --- |
| A1 temperature ° C. | 11–12° C. | 10–11° C. |
| A1 rpm | 500 | 500 |
| C1 temperature ° C. | 15–16° C. | |
| C1 rpm | 1000 | |
| A2 temperature ° C. | 9–10° C. | 7–8° C. |
| A2 rpm | 200 | 200 |
| A3 temperature ° C. | 7–8° C. | 7–8° C. |
| A3 rpm | 200–500 | 200–500 |
| B diameter | 3" | 3" |

It was observed that Sample 2 made by the prior art process produced a spread which was somewhat sandy and had only moderate flavor released. Sample 1 was produced according to the inventive process and was observed to be smooth, have a good mouth feel and good flavor release.

EXAMPLE 3

Two samples of stick products having the formula described in Example 2, Sample 1 were prepared according to the inventive processing conditions of Example 2, Sample 1, except that the rotor speed or shearing rate of the C1-unit was varied from 200 rpm. The resulting sticks were tested for hardness (C-values) as described in 1 and visually evaluated with the following results:

| C1 Unit rpm | Product C-value | Visual Observation |
| --- | --- | --- |
| 200 | 2401 | grainy, brittle |
| 1000 | 1579 | smooth, good salt release |

It was observed that when the shear rate of the crystallizing unit was 200 rpm the stick products were grainy, brittle and not spreadable. Increasing the shear he C1-unit improved spreadability and salt release of the products.

In the claims:

1. A fat continuous stick product having up to 80% of a fat containing less than 10% trans fatty acids prepared by a process comprising the steps of (1) selecting a structuring amount of a hardstock fat to make a stick product, the hardstock fat having a level of trans fatty acids not exceeding 10% and prepared by randomly interesterifing a mixture containing 30–75 wt. % of an oil (i) in which at least 20% of the fatty acids residues consist of linoleic acid and 25–70 wt. % of a fat (ii) in which at least 80% of the fatty acid residues is saturated and has a chain link of at least 16 carbons and then fractionating the interesterified mixture to obtain an olein fraction having a solid fat content of:

$N_{10}$=22–80, $N_{20}$=8–60, $N_{30}$=1–25, $N_{35}$=0–15;

(2) selecting an effective amount of an oil which is liquid at room temperature selected from the group consisting of soybean oil, sunflower oil, fish oil, rapeseed oil, coconut oil, peanut oil, palm oil, corn oil, sesame oil, sardine oil, lard, tallow and mixtures thereof;

(3) combining the hardstock fat of step (1) and the liquid oil of step (2) to form a fat phase;

(4) preparing an aqueous phase to combine with the fat phase of step (3) to provide a stick product having from 30–80% fat in the total composition;

(5) introducing the aqueous phase and the fat phase into a scrapped surface heat exchanger unit to form a cooled emulsion from the fat phase and aqueous phase wherein the cooled emulsion has an exit temperature of less than 20° C.;

(6) passing the cooled emulsion into a crystallizing (C-unit) unit having an exit temperature of C-unit greater than the exit temperature of the cooled emulsion and the crystallizing unit having a shear rate of less than 1800 rpm to aid in forming a finer dispersion and to initiate crystallization in the cooled emulsion; and (7) passing the cooled emulsion with the fat crystals into a second scrapped surface heat exchanger unit having a temperature range of at least 2–8° C. below the exit temperature of the cooled emulsion, wherein the residence time of the process is less than ten minutes to form a fat continuous stick product which stands upon its own weight and has a mean aqueous phase droplet size distribution d3.3 of less than 10 microns and has a C-value of between 800 and 1579.

2. A product according to claim 1 wherein the crystallized emulsion exiting from the second scrapped surface heat exchange unit of step (7) passes through an additional crystallizing unit.

3. The product according to claim 1 wherein oil (i) is a vegetable oil selected from the group consisting of soybean oil, sunflower oil, fish oil, rapeseed oil, coconut oil, peanut oil, palm oil, corn oil, sesame oil, sardine oil, lard, tallow and mixtures thereof.

4. A product according to claim 1 wherein fat (ii) is a hydrogenated oil having a melting point ranging from 50 to 70° C. and an iodine value of less than 10.

5. The product according to claim 1 wherein partially or fully hardened vegetable oil is added to the liquid oil and hardstock in step (3) to form the fat phase.

6. The product according to claim 1 wherein the trans fatty acid level of the stick product is 0.1 to 8%.

7. A process for preparing a fat continuous stick product having up to 80% of a fat containing less than 10% trans fatty acids comprising the steps of: (1) selecting a structuring amount of a hardstock fat to make a stick product, the hardstock fat having a level of trans fatty acids not exceeding 10% and prepared by randomly interesterifing a mixture containing 30–75 wt. % of an oil (i) in which at least 20% of the fatty acids residues consist of linoleic acid and 25–70 wt. % of a fat (ii) in which at least 80% of the fatty acid residues is saturated and has a chain link of at least 16 carbons and then fractionating the interesterified mixture to obtain an olein fraction having a solid fat content of:

$N_{10}$=22–80, $N_{20}$=8–60, $N_{30}$=1–25, $N_{35}$=0–15;

(2) selecting an effective amount of an oil which is liquid at room temperature selected from the group consisting of soybean oil, sunflower oil, fish oil, rapeseed oil, coconut oil, peanut oil, palm oil, corn oil, sesame oil, sardine oil, lard, tallow and mixtures thereof;

(3) combining the hardstock fat of step (1) and the liquid oil of step (2) to form a fat phase;

(4) preparing an aqueous phase to combine with the fat phase of step (3) to provide a stick product having from 30–80% fat in the total composition;

(5) introducing the aqueous phase and the fat phase into a scrapped surface heat exchanger unit to form a cooled emulsion from the fat phase and aqueous phase wherein the cooled emulsion has an exit temperature of less than 20° C.;

(6) passing the cooled emulsion into a crystallizing unit (C-unit) having an exit temperature of C-unit greater than the exit temperature of the cooled emulsion and the crystallizing unit having a shear rate of less than 1800 rpm to aid in forming a finer dispersion and to initiate crystallization in the emulsion; and (7) passing the cooled emulsion with the fat crystals into a second scrapped surface heat exchanger unit having a temperature range of at least 2–8° C. below the exit temperature of the cooled emulsion, wherein the residence time of the process is less than ten minutes to form a fat continuous stick product which stands upon its own weight and has a mean aqueous phase droplet size distribution d3.3 of less than 10 microns and has a C-value of between 800 and 1579.

8. A process according to claim 7 wherein the emulsion with the fat crystals exiting from the second scrapped surface heat exchange unit of step (7) passes through an additional crystallizing unit(s).

9. A process according to claim 7 wherein oil (i) is a vegetable oil selected from the group consisting of soybean oil, sunflower oil, fish oil, rapeseed oil, coconut oil, peanut oil, palm oil, corn oil, sesame oil, sardine oil, lard, tallow and mixtures thereof.

10. A process according to claim 7 wherein fat (ii) is a hydrogenated oil having a melting point ranging from 50 to 70° C. and an iodine value of less than 10.

11. A process according to claim 7 wherein partially or fully hardened vegetable oil is added to the liquid oil and hardstock in step (3) to form the fat phase.

12. A process according to claim 7 wherein the trans fatty acid level of the stick product is 0.1 to 8%.

* * * * *